(12) United States Patent
Takeguchi et al.

(10) Patent No.: US 7,239,649 B2
(45) Date of Patent: Jul. 3, 2007

(54) TRANSMISSION SYSTEM

(75) Inventors: Koji Takeguchi, Richardson, TX (US);
Ryuichi Moriya, Kawasaki (JP);
Nobuhiro Rikitake, Kawasaki (JP);
Hideki Matsui, Richardson, TX (US);
Hirotaka Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 172 days.

(21) Appl. No.: 09/886,268

(22) Filed: Jun. 21, 2001

(65) Prior Publication Data
US 2002/0018261 A1 Feb. 14, 2002

Related U.S. Application Data

(63) Continuation of application No. PCT/JP99/07521, filed on Oct. 26, 2000.

(30) Foreign Application Priority Data
Oct. 28, 1999 (WO) ........................ PCT/JP99/06013

(51) Int. Cl.
*H04J 3/24* (2006.01)

(52) U.S. Cl. .................................................. 370/473

(58) Field of Classification Search ........... 370/395.51, 370/503, 541, 544; 359/115, 140
See application file for complete search history.

(56) References Cited

U.S. PATENT DOCUMENTS

| | | | | |
|---|---|---|---|---|
| 5,257,261 A | * | 10/1993 | Parruck et al. | 370/522 |
| 5,461,622 A | * | 10/1995 | Bleickardt et al. | 370/470 |
| 5,878,039 A | * | 3/1999 | Gorshe et al. | 370/376 |
| 5,917,870 A | * | 6/1999 | Wolf | 375/356 |
| 6,011,797 A | | 1/2000 | Sugawara | |
| 6,253,247 B1 | * | 6/2001 | Bhaskar et al. | 709/237 |
| 6,473,438 B1 | * | 10/2002 | Cioffi et al. | 370/468 |

FOREIGN PATENT DOCUMENTS

| | | |
|---|---|---|
| JP | 57107658 | 7/1982 |
| JP | 59025452 | 2/1984 |
| JP | 05207052 | 8/1993 |
| JP | 06152636 | 5/1994 |
| JP | 06318924 | 11/1994 |
| JP | 10032592 | 2/1998 |
| JP | 11113034 | 4/1999 |
| JP | 0939509 A2 * | 9/1999 |

OTHER PUBLICATIONS

Japanese Office Action dated Apr. 18, 2006, with translation.

* cited by examiner

*Primary Examiner*—Doris H. To
*Assistant Examiner*—Thai Hoang
(74) *Attorney, Agent, or Firm*—Katten Muchin Rosenman LLP

(57) ABSTRACT

In order to increase the efficiency of large-capacity transmission, the continuity of divided signals generated by dividing a multiplexed signal is maintained and the original large-capacity multiplexed signal is restored. A signal dividing section divides a multiplexed signal to generate a plurality of divided signals in the STS or STM transmission interface format. A guarantee information adding section adds guarantee information for guaranteeing the continuity of the divided signals to each of the divided signals to generate transmission signals. A signal sending section sends the transmission signals via a transmission line in the transmission interface format. A signal receiving section receives the transmission signals. A signal restoring section restores the multiplexed signal by constructing the divided signals on the basis of the guarantee information.

4 Claims, 21 Drawing Sheets

GUARANTEE INFORMATION

| NAME | BYTE USED | BIT USED | CONTENTS |
|---|---|---|---|
| CONCATENATION INFORMATION | Z3 | BITS 5-8 | INFORMATION REGARDING A CONCATENATION SIGNAL BEFORE DIVISION<br>0:STS-3c, 1:STS-12c, 2:STS-48c, 3:STS-192c, 4:STS-768c |
| FRAME INFORMATION | Z4 | BITS 1-8 | FRAME NUMBER BEFORE DIVISION UP TO 256 FRAME NUMBERS (0-255) |
| BLOCK INFORMATION | Z5 | BITS 1-8 | SERIAL NUMBERS ADDED TO DIVIDED PIECES OF DATA IN ORDER OF DIVISION |

FIG. 4

GUARANTEE INFORMATION

| NAME | BYTE USED | BIT USED | CONTENTS |
|---|---|---|---|
| CONCATENATION INFORMATION | C1#2 | BITS 1-4 | INFORMATION REGARDING A CONCATENATION SIGNAL BEFORE DIVISION 0:STS-3c, 1:STS-12c, 2:STS-48c, 3:STS-192c, 4:STS-768c |
| FRAME INFORMATION | C1#2 | BITS 5-8 | FRAME NUMBER BEFORE DIVISION UP TO 16 FRAME NUMBERS (0-15) |
| BLOCK INFORMATION | C1#3 | BITS 1-8 | SERIAL NUMBER ADDED TO A DIVIDED PIECE OF DATA IN ORDER OF DIVISION ACCORDING TO WAVELENGTHS, UP TO 256 NUMBERS (0-255) |

FIG. 17

TRANSMISSION SYSTEM

This application is a continuation of international application number PCT JP99/07521, filed Oct. 26, 2000.

BACKGROUND OF THE INVENTION

1. Field of the Invention

This invention relates to a transmission system and, more particularly, to a transmission system for controlling the transmission of a multiplexed signal.

2. Description of the Related Art

SONET (Synchronous Optical Network)/SDH (Synchronous Digital Hierarchy), being the nucleus of multiplexing technologies, defines communication procedures for multiplexing various communication services effectively. The standardization of SONET/SDH is stimulating its development.

In addition, in recent years data traffic has increased especially on the Internet and various communication services are needed. Therefore, it is hoped that SONET/SDH transmission systems with larger capacity will be introduced into the current backbone networks.

FIG. 20 is a view showing the structure of the format of a synchronous transport signal-1 (STS-1). An STS-1 (51.84 Mbps) is a frame being the standard unit for SONET. On the other hand, a synchronous transport module-1 (STM-1: 155.52 Mbps) is a frame being the standard unit for SDH.

The format of an STS-1 frame consists of 9 (rows)×90 (bytes). In FIG. 20, the leftmost three bytes are used as an overhead (OH) area. The remaining eighty-seven bytes less a path overhead (POH) area are a payload where actual user data will be inserted.

With SONET/SDH, multiplexing will be controlled by the use of the standardized multiplexing unit called a virtual container (VC). Multiplexing by a VC is always performed by the byte. VC's are concatenated to generate a concatenation signal. With SONET, for example, a concatenation signal with a capacity of N times the capacity of a VC is symbolized as STS-Nc.

FIG. 21 is a view showing the structure of the format of an STS-12c. An STS-12c frame is represented by a two-dimensional byte array consisting of 9 (rows)×1080 (columns). The leading 9 (rows)×36 (columns) are an OH area and the subsequent 9 (rows)×1044 (columns) are a payload where multiplexed information is stored. Four STS-3c sets, CH1 through CH4, are multiplexed in this payload portion.

Byte H1 is located in column 1 to column 12 of a pointer in row 4 and byte H2 is located in column 13 to column 24 of the pointer in row 4. Bits 7 and 8 of byte H1 and 8 bits of byte H2 form a 10-bit pointer.

Bits 1 through 4 (4 bits) of byte H1 are a new data flag (NDF). With NDF, the value of a 10-bit pointer will be changed according to a change in the payload. For example, when there is no need to change the value of this pointer, NDF is represented by the code "0110." When the value of this pointer is changed, NDF is represented by the reverse code "1001."

However, an NDF for a subsidiary channel is "1001" (constant). A subsidiary channel of a concatenation signal is indicated by a combination of this NDF and a pointer value.

Usually the value of a 10-bit pointer for a leading channel is a number between 0 and 782. On the other hand, the bits of a 10-bit pointer for a subsidiary channel of a concatenation signal are all "1." A combination of the NDF ("1001") and the 10-bit pointer ("1111111111") indicates that it is a subsidiary channel. For example, an STS-12c consists of four channels. Therefore, the value of a 10-bit pointer for channel 1 is a number between 0 and 782. Channels 2, 3, and 4 are subsidiary to channel 1, so the bits of 10-bit pointers for them are all "1."

Generating and transmitting such a concatenation signal enables large-capacity transmission which cannot be realized by a single container.

The provision of new services, however, will need large-capacity systems. In that case, an increase in system capacity should be realized not only by extending conventional multiplex transmission systems described above but also by making effective use of the existing network systems. That is to say, it is important to minimize the extensions.

When concatenation signals, such as STS-192c's (9.953280 Gbps), are transmitted, a new high-speed transmission line and the like dedicated to STS-192c's should not be laid. If there is a transmission line on which the bit rate is limited, these large-capacity signals should be transmitted by making effective use of this transmission line.

SUMMARY OF THE INVENTION

In order to address such a problem, the present invention was made. In other words, an object of the present invention is to provide a transmission system for transmitting a large-capacity multiplexed signal efficiently by making effective use of existing network systems in which the bit rate is limited.

In order to solve the above problem, according to the present invention, there is provided a transmission system for controlling the transmission of a multiplexed signal via a path. This transmission system comprises a sending apparatus including signal dividing means for dividing the multiplexed signal to generate a plurality of divided signals in the STS or STM transmission interface format, guarantee information adding means for adding guarantee information for guaranteeing the continuity of the divided signals to each of the divided signals to generate transmission signals, and signal sending means for sending the transmission signals, and a receiving apparatus including signal receiving means for receiving the transmission signals, and signal restoring means for restoring the multiplexed signal by constructing the divided signals on the basis of the guarantee information.

Furthermore, in order to solve the above problem, according to the present invention, there is provided a transmission system for controlling transmission of multiplexed signals via a section. This transmission system comprises a sending apparatus including signal dividing means for dividing the multiplexed signal to generate a plurality of divided signals in the STS or STM transmission interface format, guarantee information adding means for adding guarantee information for guaranteeing the continuity of the divided signals to each of the divided signals, and WDM signal sending means for converting the divided signals to which the guarantee information is added to optical signals with wavelengths different from one another to perform wavelength multiplexing on the optical signals and sending the optical signals, and a receiving apparatus including WDM signal receiving means for receiving the optical signals, separating the optical signals according to wavelengths, and converting the optical signals to the divided signals, and signal restoring means for constructing the divided signals on the basis of the guarantee information to restore the multiplexed signal.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a view showing the contents of guarantee information.

FIG. 17 is a view showing the contents of guarantee information.

DESCRIPTION OF THE PREFERRED EMBODIMENTS

Figure 1:
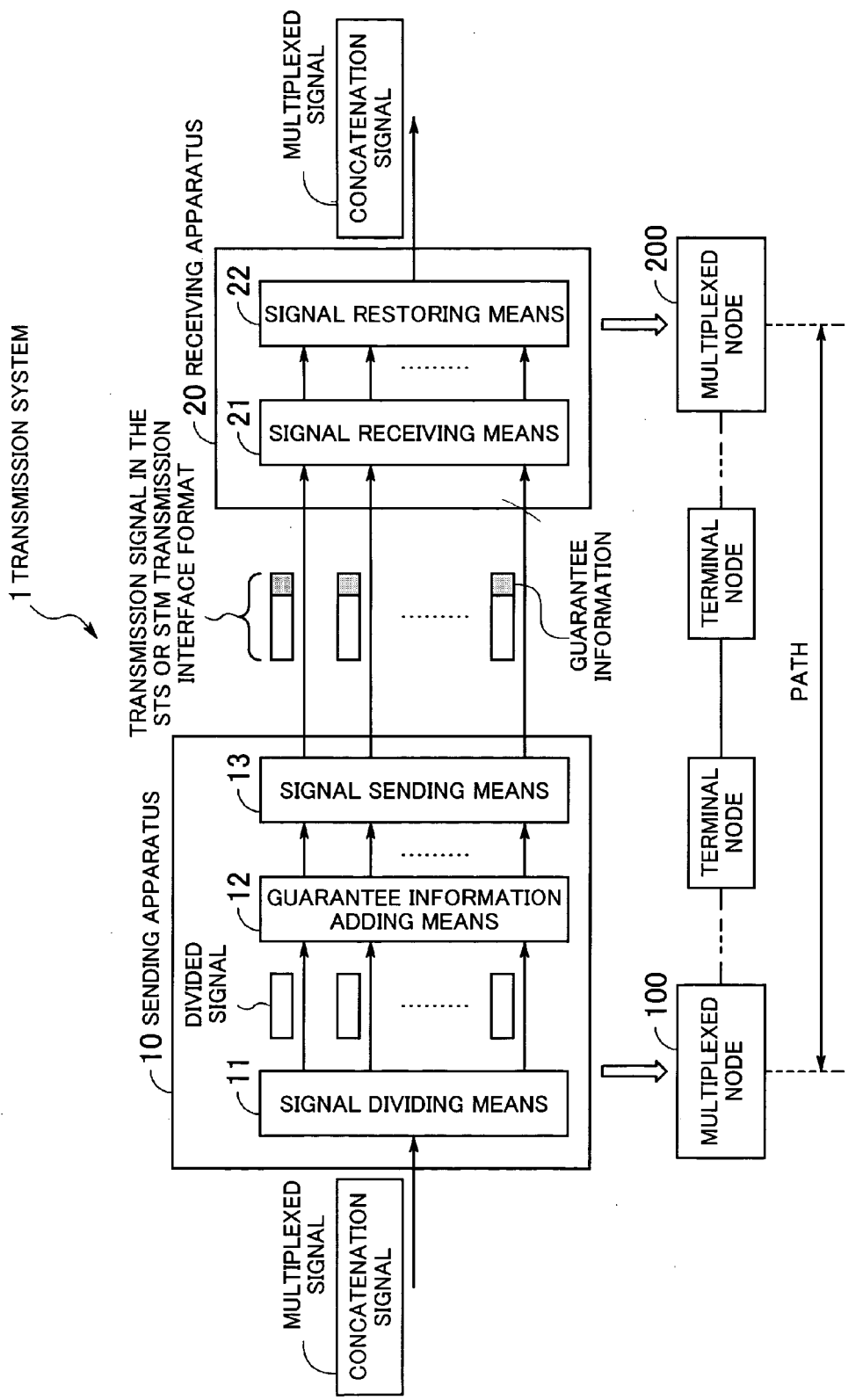
FIG. 1 is a view for describing the principles underlying a transmission system according to the present invention.

An embodiment of the present invention will now be described with reference to the drawings. FIG. 1 is a view for describing the principles underlying a transmission system according to the present invention. A transmission system 1 comprises a sending apparatus 10 and a receiving apparatus 20 and transmits multiplexed signals via a path. The sending apparatus 10 and the receiving apparatus 20 are located at multiplexed nodes 100 and 200 respectively. These nodes control transmission via a path. The functions of the sending apparatus 10 and the receiving apparatus 20 are practically included in one apparatus.

In the sending apparatus 10, signal dividing means 11 divides a multiplexed signal according to paths (path overhead+payload) to generate a plurality of divided signals in the STS (when the original multiplexed signal is transmitted in compliance with SONET) or STM (when the original multiplexed signal is transmitted in compliance with SDH) transmission interface format the transmission rate of which is lower than that of the multiplexed signal. Hereinafter a process in compliance with SONET will be described and a multiplexed signal is referred to as a concatenation signal.

The divided signals are pseudo concatenation signals having a SONET or SDH multiplexed interface the bit rate of which is lower than that of the original concatenation signal.

Guarantee information adding means 12 adds guarantee information for guaranteeing the continuity of the divided signals to each of the divided signals to generate transmission signals. By adding this guarantee information to the divided signals, the way in which the concatenation signal was divided to generate the divided signals, the order of the division, or the like can be understood on the receiver side. This enables the receiving apparatus 20 to restore the concatenation signal normally.

Signal sending means 13 sends the transmission signals in parallel via transmission lines along a path in the SONET/SDH transmission interface format.

In the receiving apparatus 20, signal receiving means 21 receives the transmission signals. On the basis of the guarantee information, signal restoring means 22 restores the original concatenation signal by constructing the divided signals.

Figure 2:
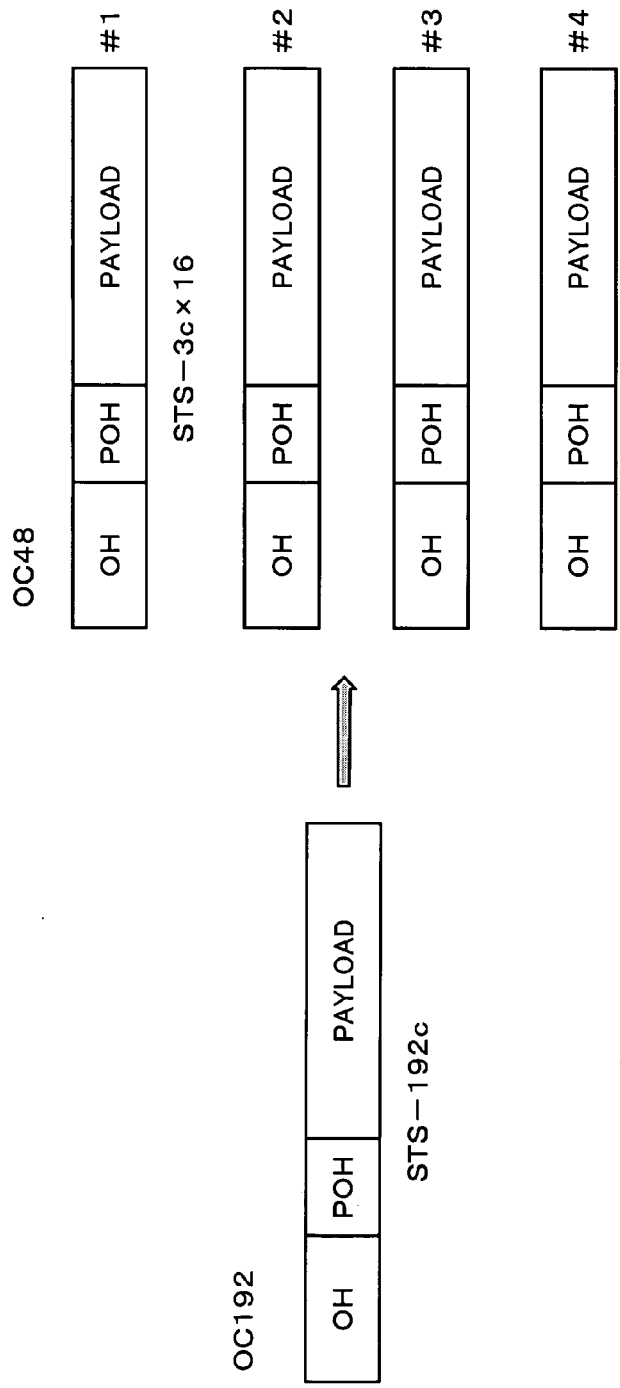
FIG. 2 is a schematic view showing the process of dividing a concatenation signal.

Now, operation performed at the time of the division will be described with a case where an STS-192c (9.953280 Gbps) is divided into STS-3c (155.52 Mbps)×64 and then transmitted as an example. FIG. 2 is a schematic view showing the process of dividing a concatenation signal.

In FIG. 2, an STS-192c concatenation signal corresponding to the optical transmission rate of optical carrier (OC) 192 is divided to generate divided signals (STS-3c) and (STS-3c×16)'s #1 through #4 corresponding to the optical transmission rate of OC-48 (2.488320 Gbps) are transmitted in parallel.

When such a dividing process is performed, OH for an STS-192c is terminated, a pointer for the STS-192c is rewritten to a pointer for an STS-3c, the STS-192c is divided into STS-3c×64 (with OH for an STS-3c added), and, as shown in FIG. 2, they are transmitted in the block. Furthermore, at the time of the division, guarantee information described later will be added to each STS-3c so that the original concatenation signal STS-192c can be restored on the receiver side.

POH for an STS-3c has only 9(bytes)×1(column), so it cannot be divided any more. The pointer bytes of an STS-3c and STM-1 are used in the following way. A pointer value is stored only in the leading byte and an indication signal is stored in the subsequent bytes. In the payloads of an STS-3c and STM-1, one VC-4 is multiplexed.

The above explanation has been given with a case where a divided signal STS-3c is generated from STS-192c as an example. However, the signal dividing means 11 according to the present invention divides a concatenation signal properly according to a bit rate available for a transmission line laid to generate divided signals (concatenation signals) the bit rate of which is equal to (or lower than) that of the concatenation signal.

Figure 3:
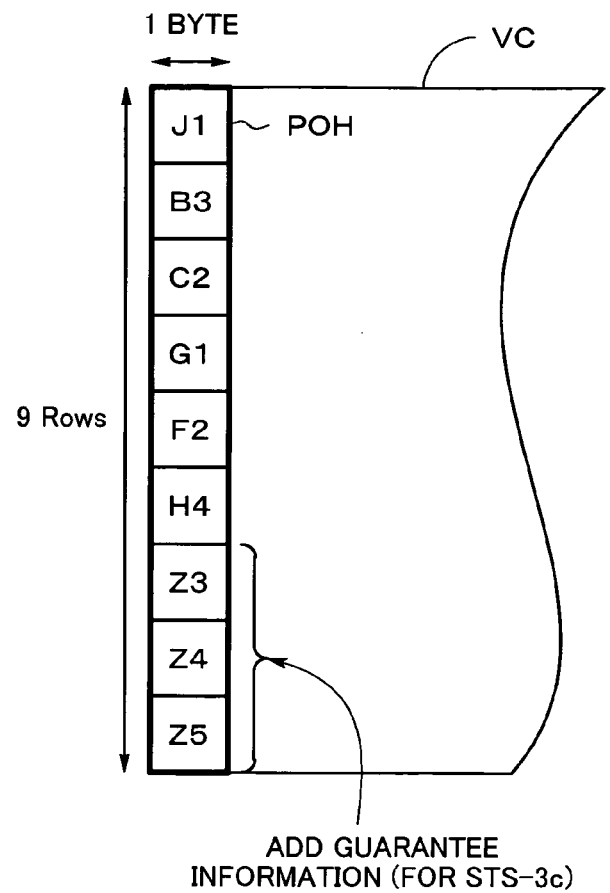
FIG. 3 is a view showing POH.

Guarantee information will now be described. The guarantee information adding means 12 adds guarantee information in empty bytes of a path overhead (POH) for a divided signal. FIG. 3 is a view showing POH.

POH is control information included in a VC for managing a path between multiplexed nodes and is used for error detection, network maintenance, and the like. Z3 through Z5 shown in FIG. 3 are empty bytes. In the present invention, these empty bytes will be used to add guarantee information.

FIG. 4 is a view showing the contents of guarantee information. In this case, a divided signal is an STS-3c. When guarantee information is added to the STS-3c, bytes Z3 through Z5 are used.

Concatenation information is added in bits 5 through 8 of byte Z3 (bits 1 through 4 of byte Z3 are reserved). The contents of concatenation information indicate what the original concatenation signal is. For example, 0, 1, 2, 3, and 4 indicate STS-3c, STS-12c, STS-48c, STS-192c, and STS-768c respectively.

Frame information is added in bits 1 through 8 of byte Z4. The contents of frame information indicate a frame number before division. For example, if the original concatenation signal is OC-192, they indicate which OC-192 frame it is. Up to 256 frame numbers (0–255) can be set.

Block information is added in bits 1 through 8 of byte Z5. The contents of block information indicate a division number at the time of division. Divided signals are numbered serially in order of division. These signals should be reproduced in numerical order on the receiver side.

In the above explanation, bytes Z3 through Z5 have been used for an STS-3c. On the other hand, one of bytes Z3 through Z5 can be used multiple times for concatenation signals other than STS-3c's. For example, when an STS-192c is divided into STS-12c's, guarantee information can be added to Z4 #1, Z4 #2, and Z4 #3.

With an ordinary multiplexed node, processes, such as a cross connection, are performed according to paths (POH+ payload). Therefore, unlike line OH and section OH, POH will not be lost as a result of termination. In the present invention, guarantee information is added to POH so that it will not be lost at the time of internal processing.

Figure 5:
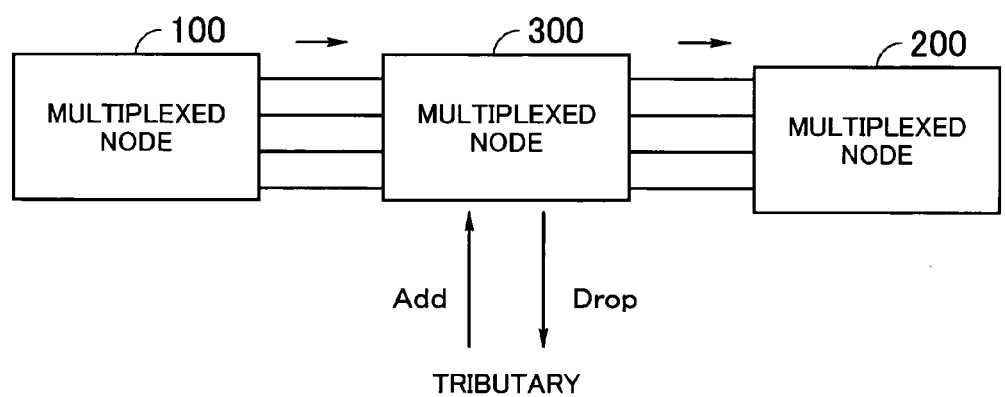
FIG. 5 is a view showing a case where a multiplexed node which accommodates a tributary is located between multiplexed nodes.

FIG. 5 is a view showing a case where a multiplexed node which accommodates a tributary is located between multiplexed nodes 100 and 200. A multiplexed node 300 which accommodates a tributary is located between the multiplexed nodes 100 and 200.

The multiplexed node 300 receives signals sent from a tributary and multiplexes them, together with signals sent from the multiplexed node 100, to the multiplexed node 200 (Add). Moreover, the multiplexed node 300 receives signals sent from the multiplexed node 100, separates signals to be sent to the tributary from the rest, and sends the signals to the tributary (Drop).

The transmission system 1 for controlling transmission via a path according to the present invention controls processes ranging from the division of a concatenation signal to the restoration of a concatenation signal. Guarantee information therefore is added to POH. As a result, even if the multiplexed node 300 having the cross-connection function shown in FIG. 5 is on a transmission line, guarantee information will not be lost and the division/restoration of a concatenation signal can be controlled.

Figure 6:
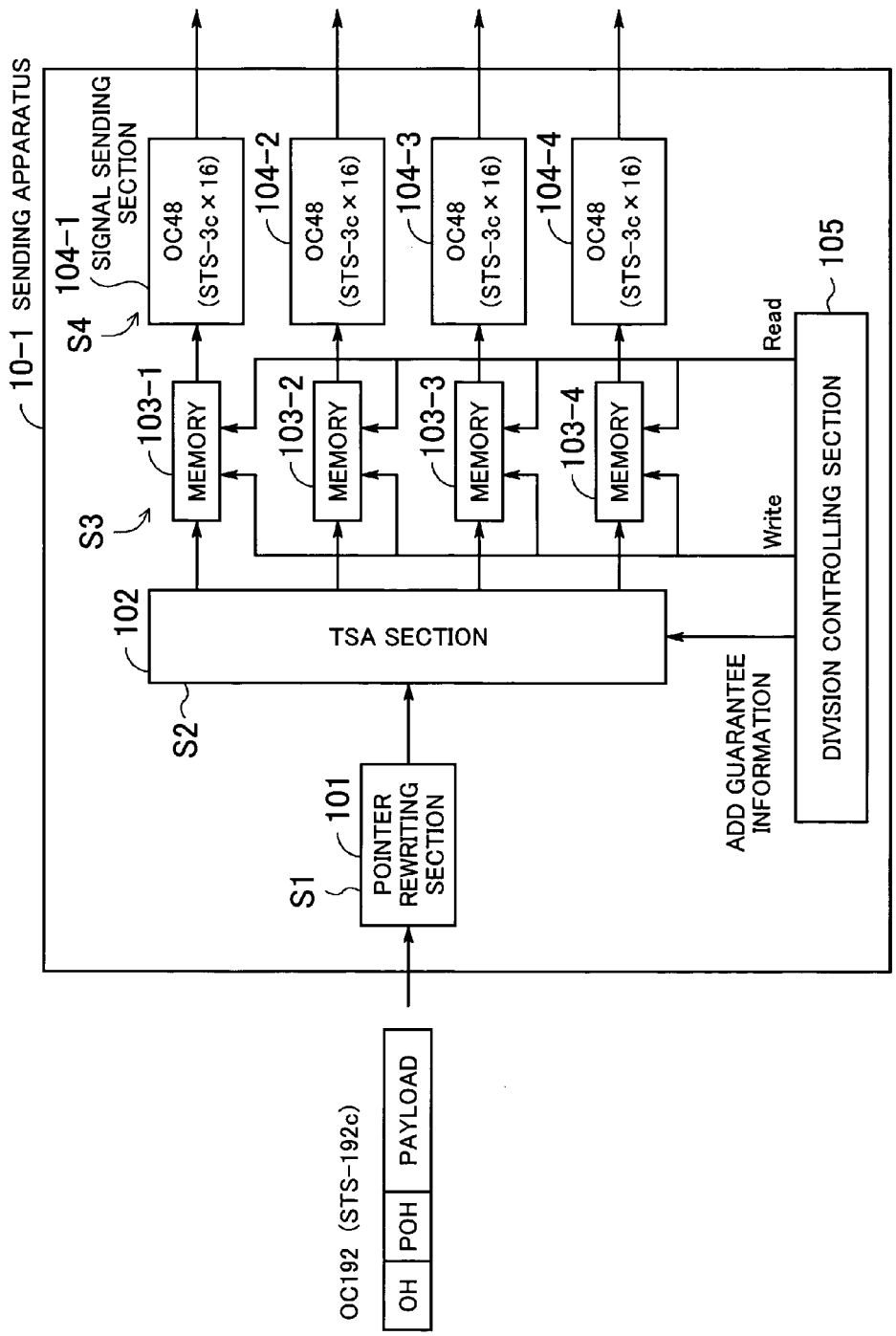
FIG. 6 is a block diagram showing the configuration of a sending apparatus.
Figure 7:
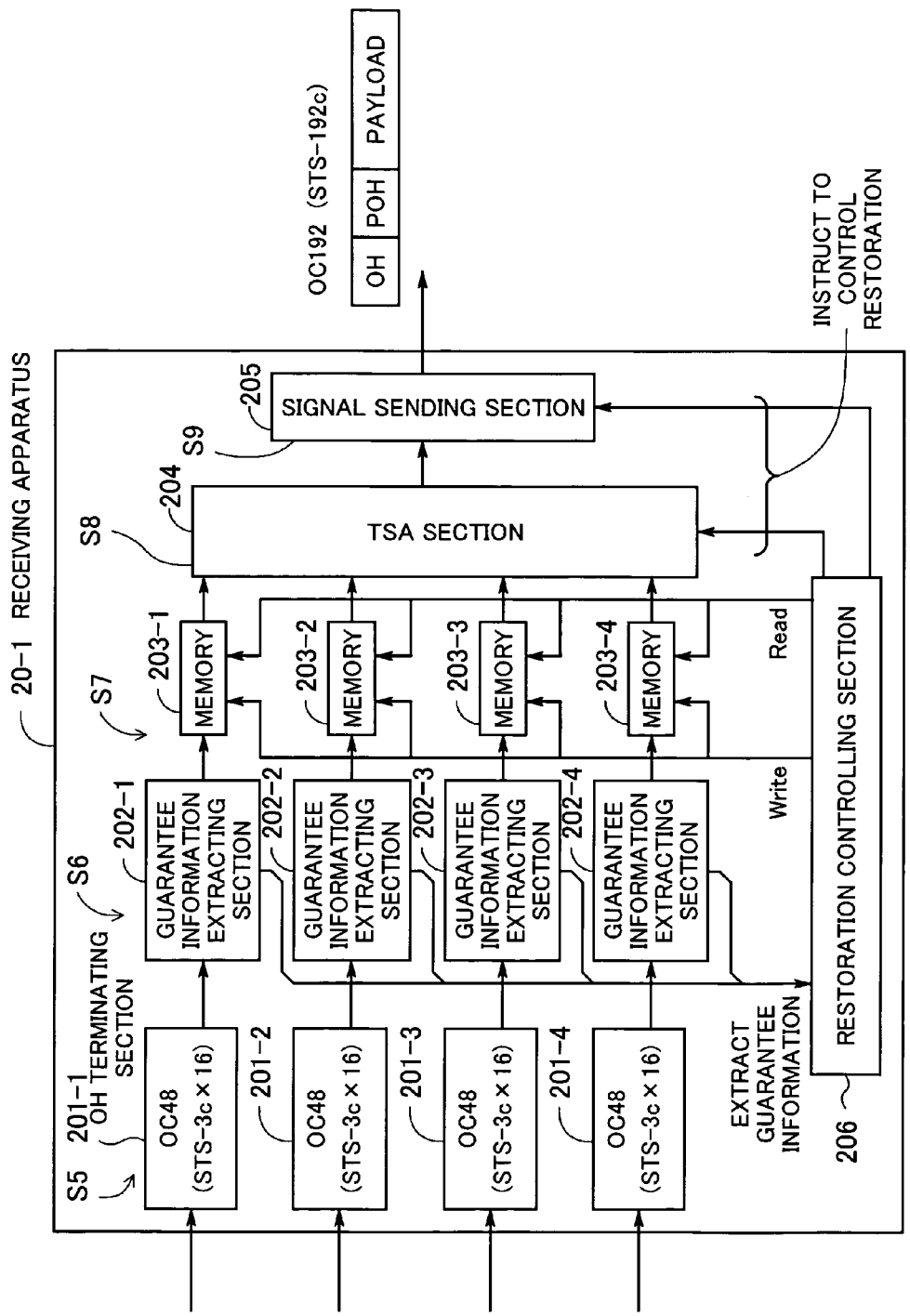
FIG. 7 is a block diagram showing the configuration of a receiving apparatus.

Now, the configuration and operation of the transmission system 1 in which functions according to the present invention are embodied will be described. FIG. 6 is a block diagram showing the configuration of a sending apparatus. FIG. 7 is a block diagram showing the configuration of a receiving apparatus. In FIGS. 6 and 7, an STS-192c is divided and four (STS-3c×16)'s are transmitted in parallel.

A sending apparatus 10-1 comprises a pointer rewriting section 101 for rewriting a pointer, a time slot assignment (TSA) section 102 for adding guarantee information and dividing an STS-192c into STS-3c's, memories 103-1 through 103-4 for converting a rate, signal sending sections 104-1 through 104-4 for controlling an interface for sending signals, and a division controlling section 105 for exercising necessary control over each section at the time of division.

A receiving apparatus 20-1 comprises OH terminating sections 201-1 through 201-4 for terminating OH, guarantee information extracting sections 202-1 through 202-4 for extracting guarantee information, memories 203-1 through 203-4 for converting a rate, a TSA section 204 for constructing divided signals, a signal sending section 205 for controlling an interface for sending signals, and a restoration controlling section 206 for exercising necessary control over each section at the time of restoration.

The operation will now be described.

[S1] The pointer rewriting section 101 terminates OH for an STS-192c and then rewrites a pointer for the STS-192c to one for an STS-3c. By rewriting to a pointer for an STS-3c in this way as preprocessing, the pointer rewriting section 101 adds pseudo OH for an STS-3c (generates a pseudo frame). This will make processes performed on an STS-3c in subsequent steps efficient.

[S2] The TSA section 102 cross-connects by the STS-3c and generates divided signals with a transmission capacity of STS-3c×16. Moreover, the above concatenation information, frame information, and block information are written into bytes Z3, Z4, and Z5 of POH for each STS-3c as guarantee information.

[S3] The memories 103-1 through 103-4 change the clock for processing data from an internal processing clock to a sending clock.

[S4] The signal sending sections 104-1 through 104-4 adds substantial OH for the STS-3c's, converts the format of the divided signals to that of signals transmitted at a low rate, and transmits four OC-48's ((STS-3c×16)'s) in parallel.

[S5] The OH terminating sections 201-1 through 201-4 terminate OH for the STS-3c's.

[S6] The guarantee information extracting sections 202-1 through 202-4 extract guarantee information from POH and give its contents to the restoration controlling section 206.

[S7] The memories 203-1 through 203-4 change the clock for processing data from an internal processing clock to a sending clock.

[S8] The TSA section 204 cross-connects on the basis of the restoration information (guarantee information) given by the restoration controlling section 206 and performs the process of constructing the STS-3c's.

[S9] The signal sending section 205 restores the original STS-192c by adding OH including a pointer for an STS-192c to a signal which was constructed in step S8 and sends it to a transmission line.

Now, delay correction control at the time of parallel transmission will be described with reference to FIGS. 8 through 14. Sending signals in parallel will cause a transmission delay on each transmission line. The dispersion of the length of each transmission line or the characteristics of circuit components used in sending and receiving sections, wavelength or mode dispersion which occurs within an optical fiber transmission line, or the like can be the main reason for the transmission delay.

When light is propagated through the inside of an optical fiber, its refractive index will vary according to its wavelength. As a result, a difference in arrival time arises at the receiving end. This is a delay caused by wavelength dispersion. When modulated light passes through the inside of an optical fiber, optical pulses will spread with time. As a result, a difference in arrival time arises at the receiving end. This is a delay caused by mode dispersion.

Therefore, when transmission signals are sent in parallel, delays which occur from these causes should be corrected.

Figure 8:
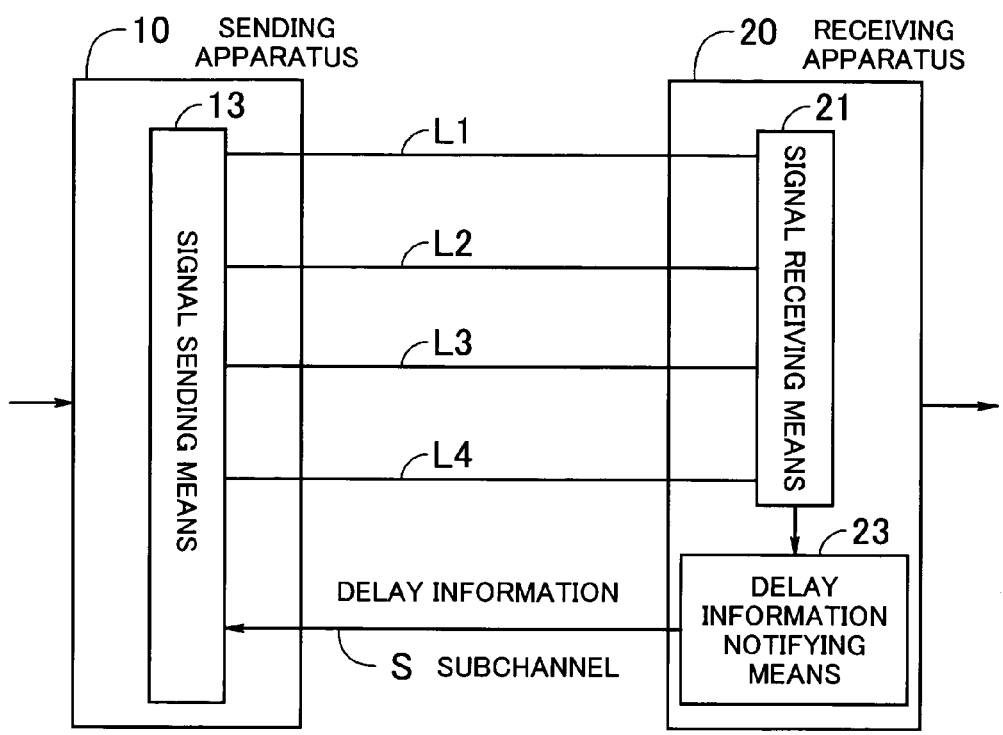
FIG. 8 is a view for describing delay information notifying means.

FIG. 8 is a view for describing delay information notifying means. The sending apparatus 10 and the receiving apparatus 20 are connected by transmission lines L1 through L4. Transmission signals are sent from the sending apparatus 10 to the receiving apparatus 20 via the transmission lines L1 through L4.

Delay information notifying means 23 gives delay information regarding a delay which has occurred on each of the transmission lines L1 through L4 at the time of the signal receiving means 21 receiving the transmission signals to the signal sending means 13 in the sending apparatus 10 via subchannel S.

On the basis of the delay information, the signal sending means 13 sets the bit rate of each transmission signal variable and makes delay correction.

Figure 9:
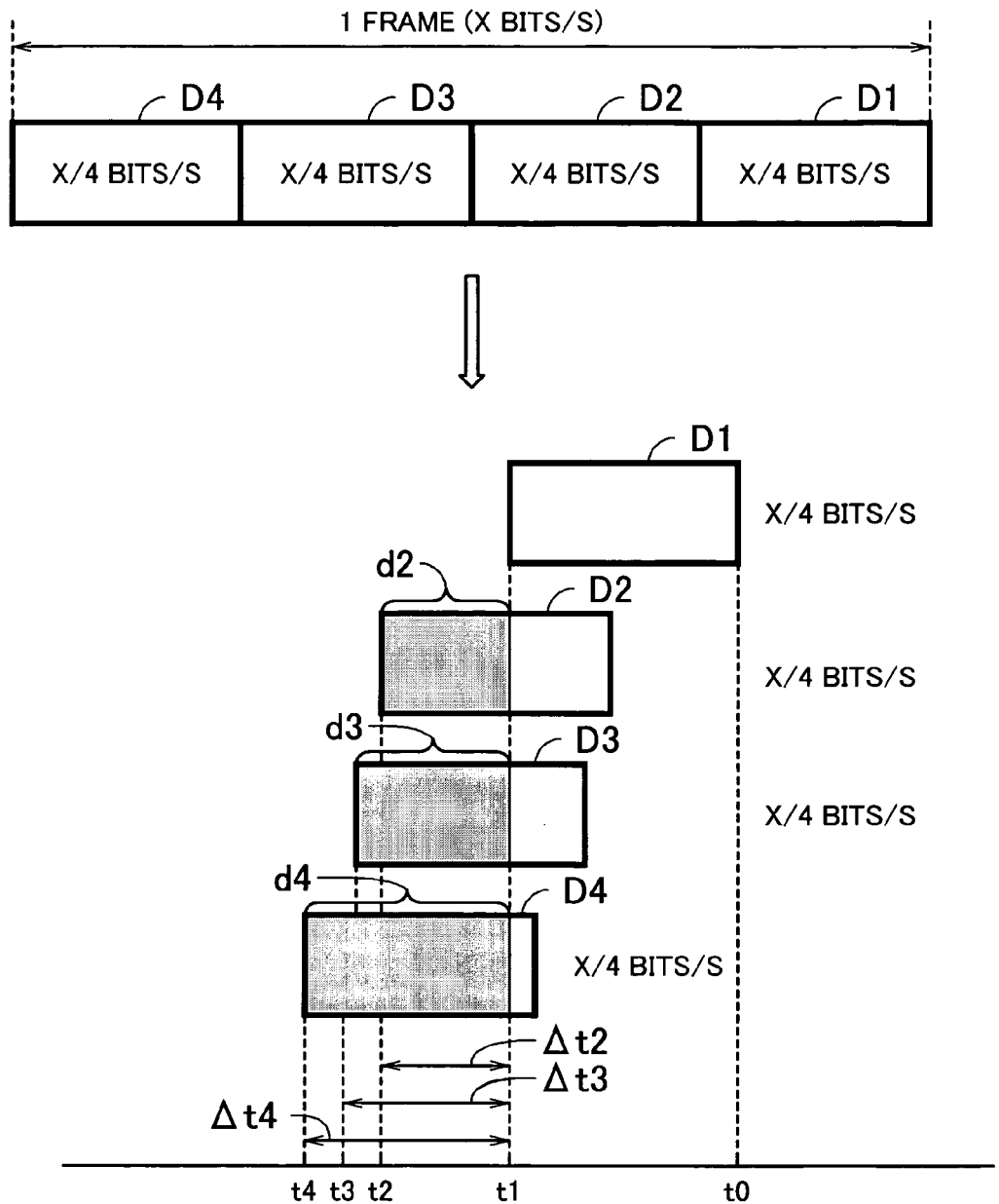
FIG. 9 is a view showing time relationships among signals transmitted in parallel.

Concrete operations for delay correction will now be described. FIG. 9 is a view showing time relationships among signals transmitted in parallel.

It is assumed that four pieces of data which the sending apparatus 10 generates by dividing information of one frame (X bits/s) in four are data D1 (which arrives at the receiving apparatus 20 at time t0), D2, D3, and D4 according to the order in which they arrive at the receiving apparatus 20. Each piece of data consists of X/4 bits/s. Moreover, it is assumed that the receipt of data D1 through D4 is completed at time t1 through t4 respectively. In addition, it is assumed that (t2−t1)=Δt2, (t3−t1)=Δt3, and (t4−t1)=Δt4.

The delay information notifying means 23 gives the values of Δt2, Δt3, and Δt4 to the sending apparatus 10 via subchannel S. On the basis of this information, the signal sending means 13 in the sending apparatus 10 controls correction of a delay of each of the signals transmitted in parallel.

In this case, if all the pieces of data are sent so as to reach by time t1, there is no need to locate, for example, a large-scale buffer circuit, which absorbs difference in transmission line delay, on the receiving apparatus 20 side. It is assumed that portions of data D2 through D4 which do not reach by time t1 are delay data d2 through d4 respectively.

Figure 10:
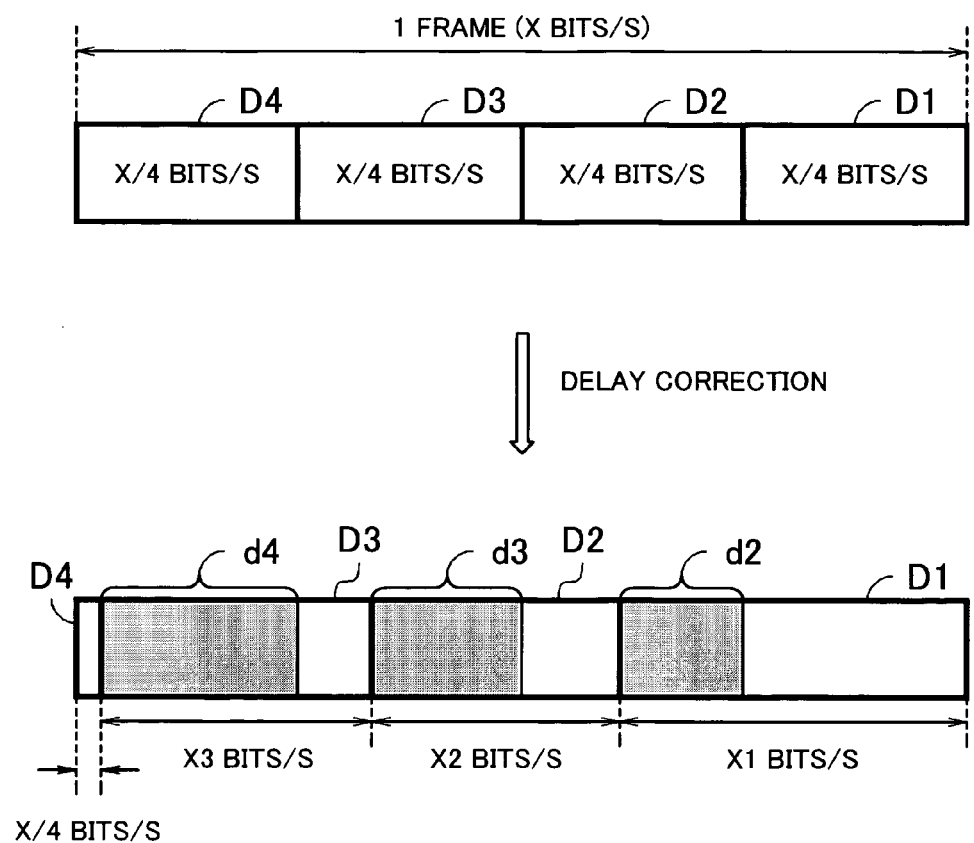
FIG. 10 is a view showing how to make delay correction.
Figure 11:
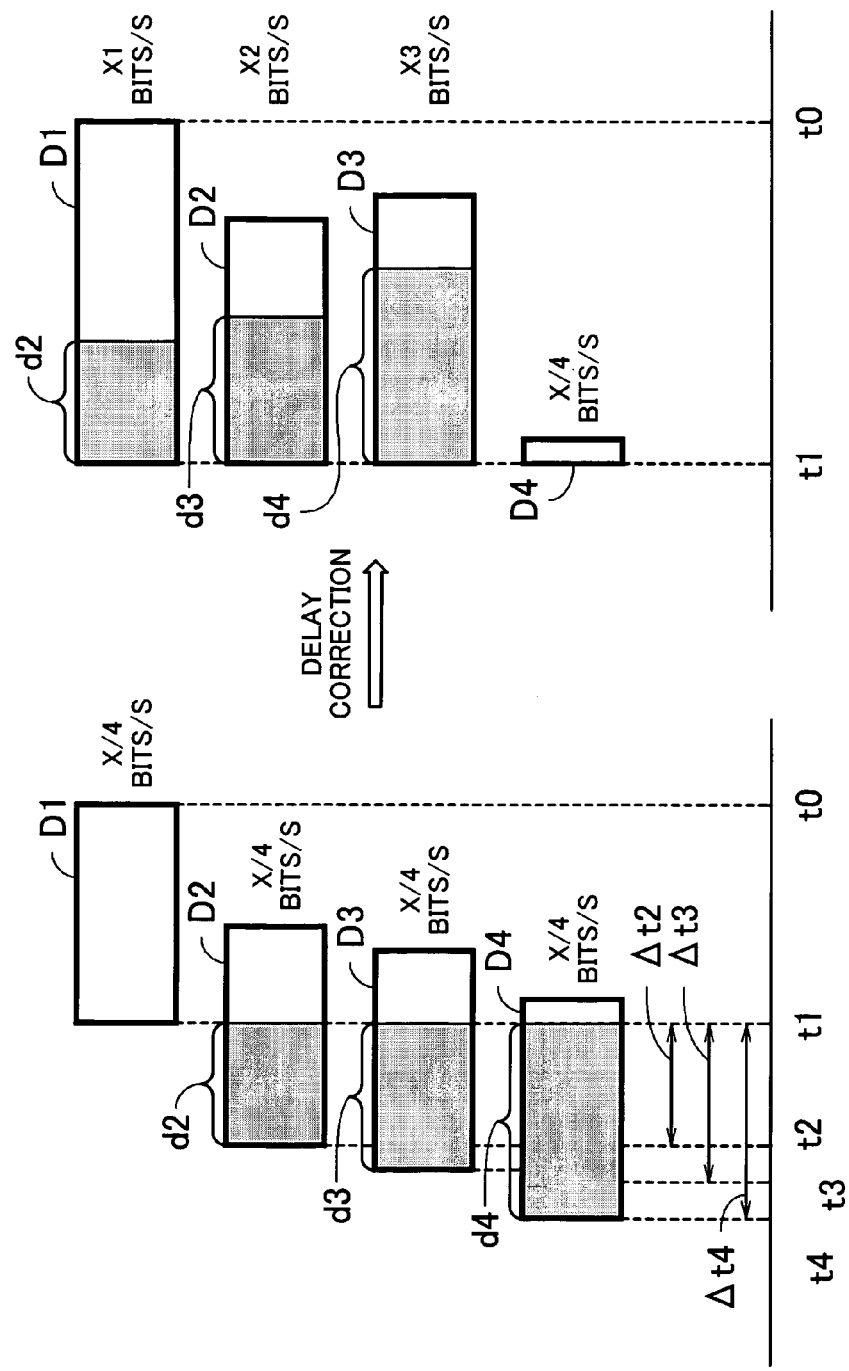
FIG. 11 is a view showing how to make delay correction.

FIGS. 10 and 11 are views showing how to make delay correction. On the basis of delay information, the signal sending means 13 calculates the bit rates of data D1, D2, D3, and D4 (X1, X2, X3, and X4 bits/s respectively) and divides the original frame.

In this case, the division must meet the conditions that X1+X2+X3+X4=X, that all the pieces of data should reach by time t1, and that X1≧X2≧X3≧X4 (a transmission line on which data reaches earlier should transmit more data).

On the basis of these three conditions, a bit rate on each of transmission lines L1 through L4 is calculated and is mapped as shown in FIGS. 10 and 11. That is to say, X1 bits/s are assigned as data D1 so that delay data d2 will be sent via transmission line L1. Similarly, X2 bits/s are assigned as data D2 so that delay data d3 will be sent via transmission line L2; X3 bits/s are assigned as data D3 so that delay data d4 will be sent via transmission line L3.

The bit rate on transmission line L4 corresponding to data D4 (which reaches last) is X4 bits/s in FIGS. 10 and 11, but in reality it is fixed at (X/4) bits/s so that transmission line L4 also serves as a clock transmission line.

Figure 12:
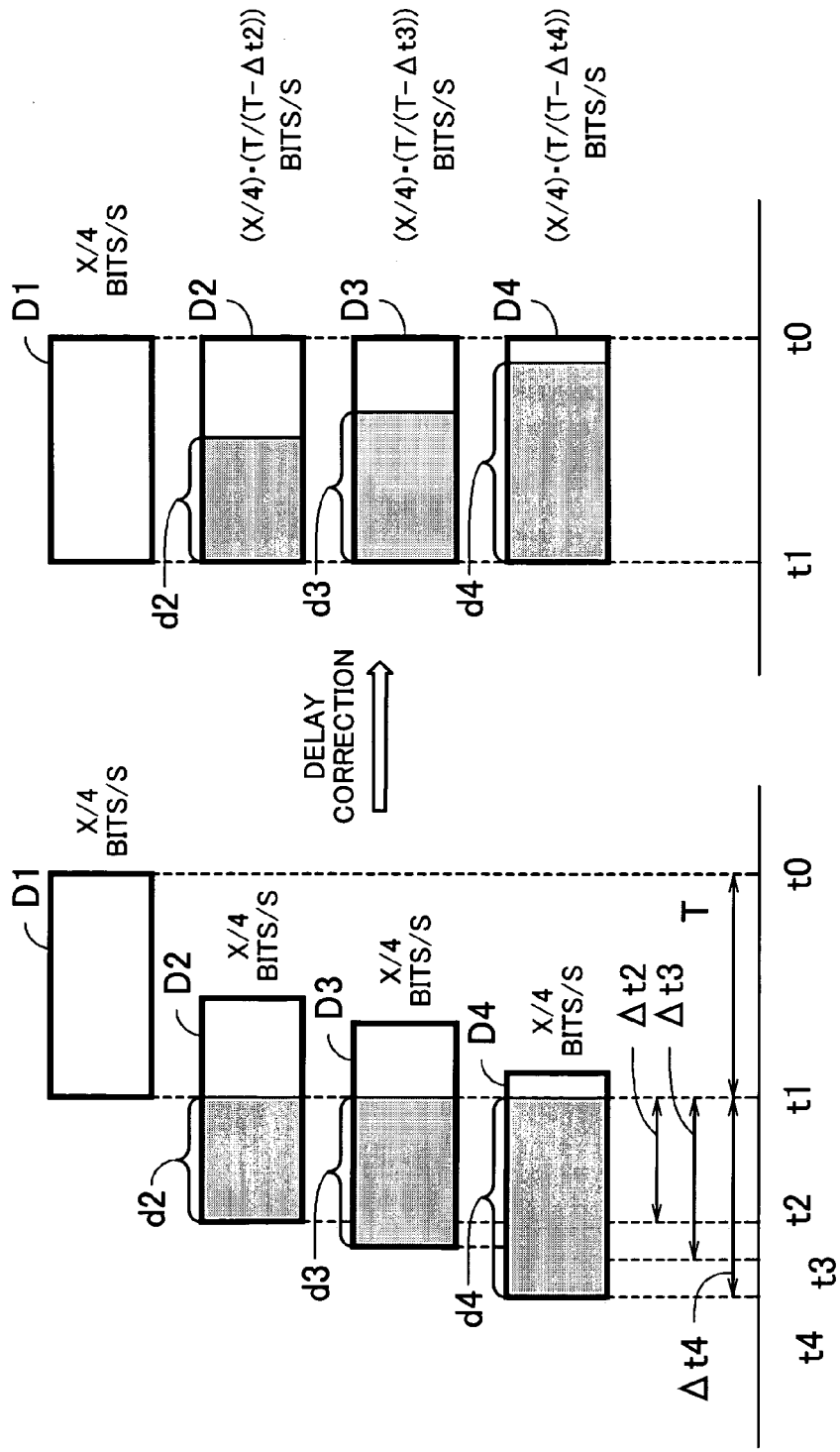
FIG. 12 is a view showing a first modification of delay correction.

FIG. 12 is a view showing a first modification of delay correction. In the first modification, the bit rate of data D1 remains at (X/4) bits/s, and the bit rates of data D2 through D4 are corrected with (X/4) bits/s as a standard so that they reach by time t1.

If t1−t0=T, then delay data d2 of data D2 must be transmitted at the rate of (X/4)·(T/(T−Δt2)) bits/s so as to reach by time t1.

Similarly, delay data d3 of data D3 must be transmitted at the rate of (X/4)·(T/(T−Δt3)) bits/s so as to reach by time t1; delay data d4 of data D4 must be transmitted at the rate of (X/4)·(T/(T−Δt4)) bits/s so as to reach by time t1.

Figure 13:
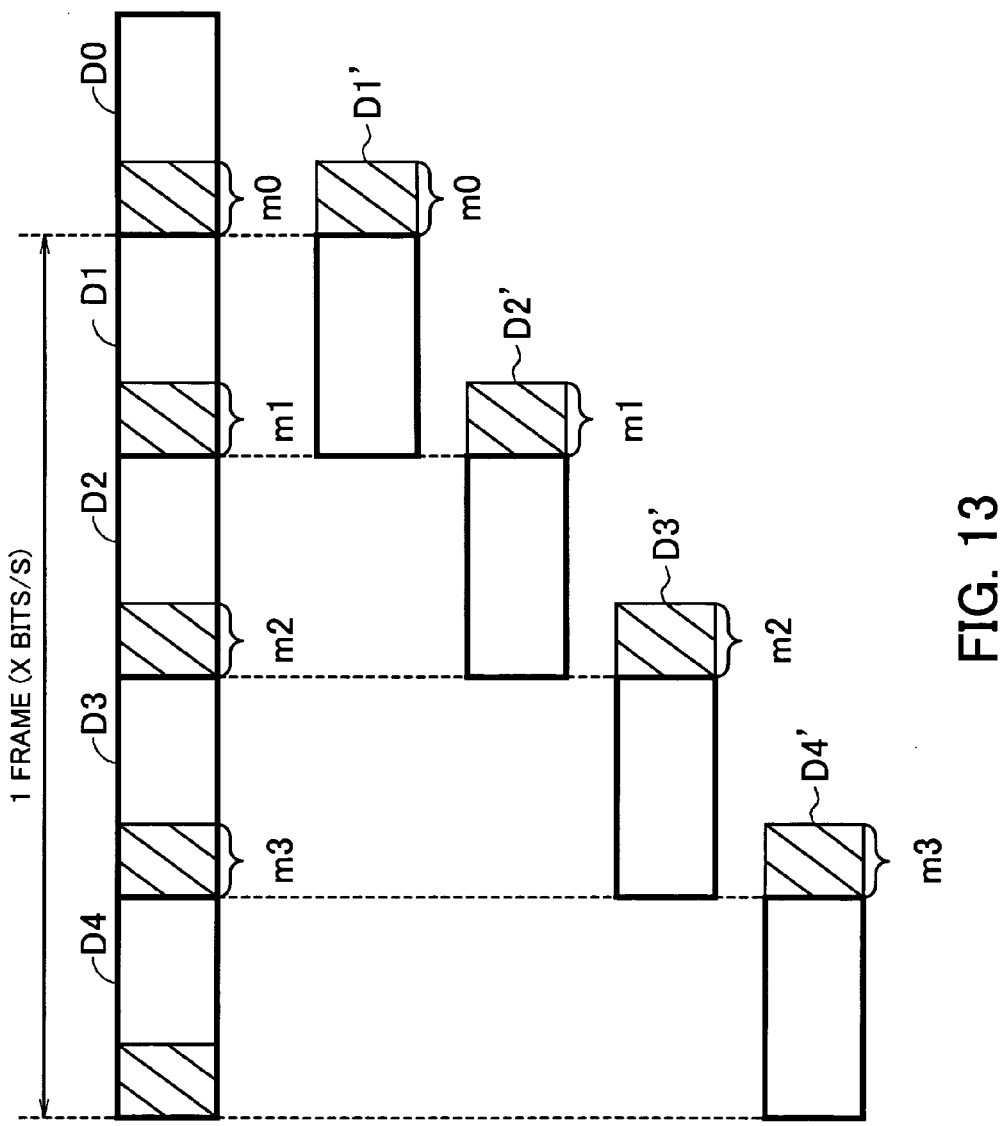
FIG. 13 is a view showing a second modification of delay correction.

FIG. 13 is a view showing a second modification of delay correction. In the second modification, the signal sending means 13 overlaps the leading section of a divided piece of data and a portion of another divided piece of data and sends them.

For example, data D1' created by adding overlap m0, being part of data D0, in front of data D1 is sent. Similarly, data D2' created by adding overlap m1, being part of data D1, in front of data D2 is sent, data D3' created by adding overlap m2, being part of data D2, in front of data D3 is sent, and data D4' created by adding overlap m3, being part of data D3, in front of data D4 is sent.

Figure 14:
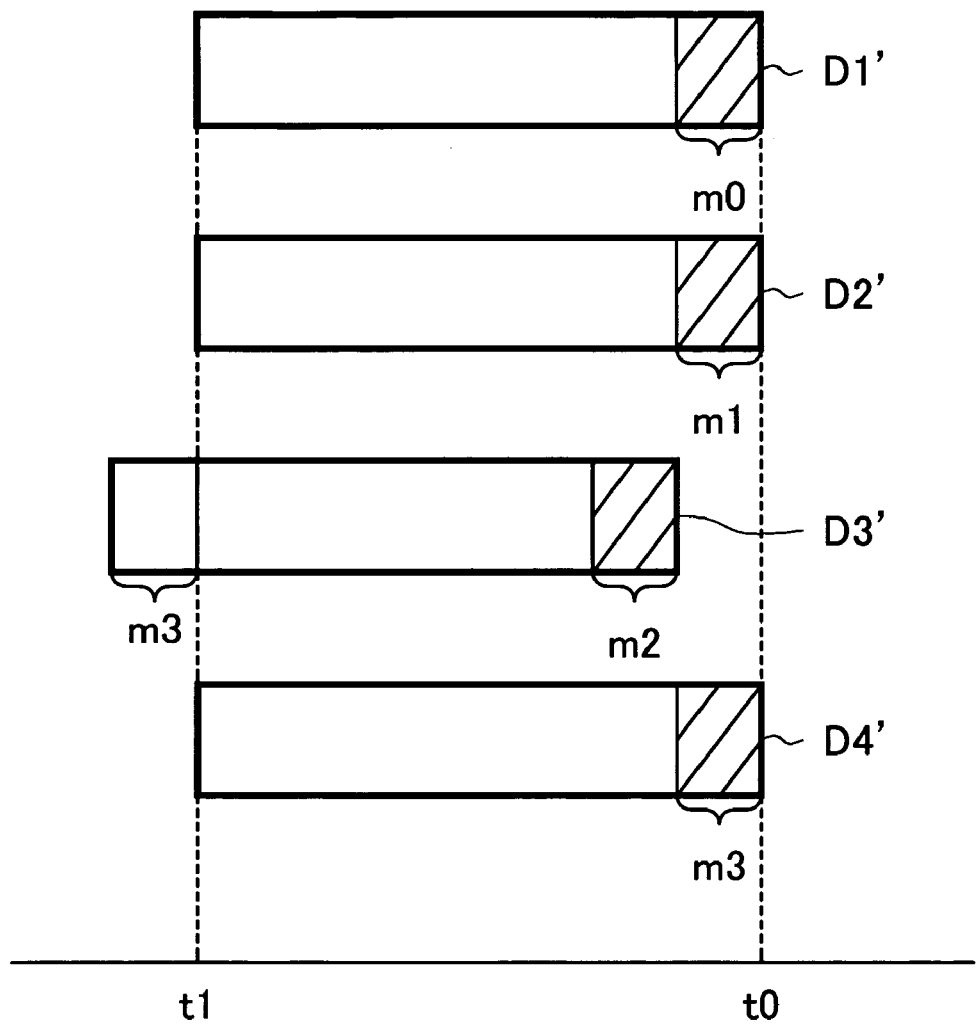
FIG. 14 is a view for describing the second modification.

FIG. 14 is a view for describing the second modification. If there is a piece of data which is late in reaching the receiver side, then the same data in the leading section of another divided piece of data is used to make up data in the delayed portion. As a result, the delay will be absorbed.

In FIG. 14, all the pieces of data except data D3' have reached by time t1. Therefore, data in overlap m3 added in the leading section of data D4' is used to make up data m3 of data D3' which does not reach by time t1. This absorbs the delay. By making delay correction in the above way, a transmission system with higher reliability can be realized.

Figure 15:
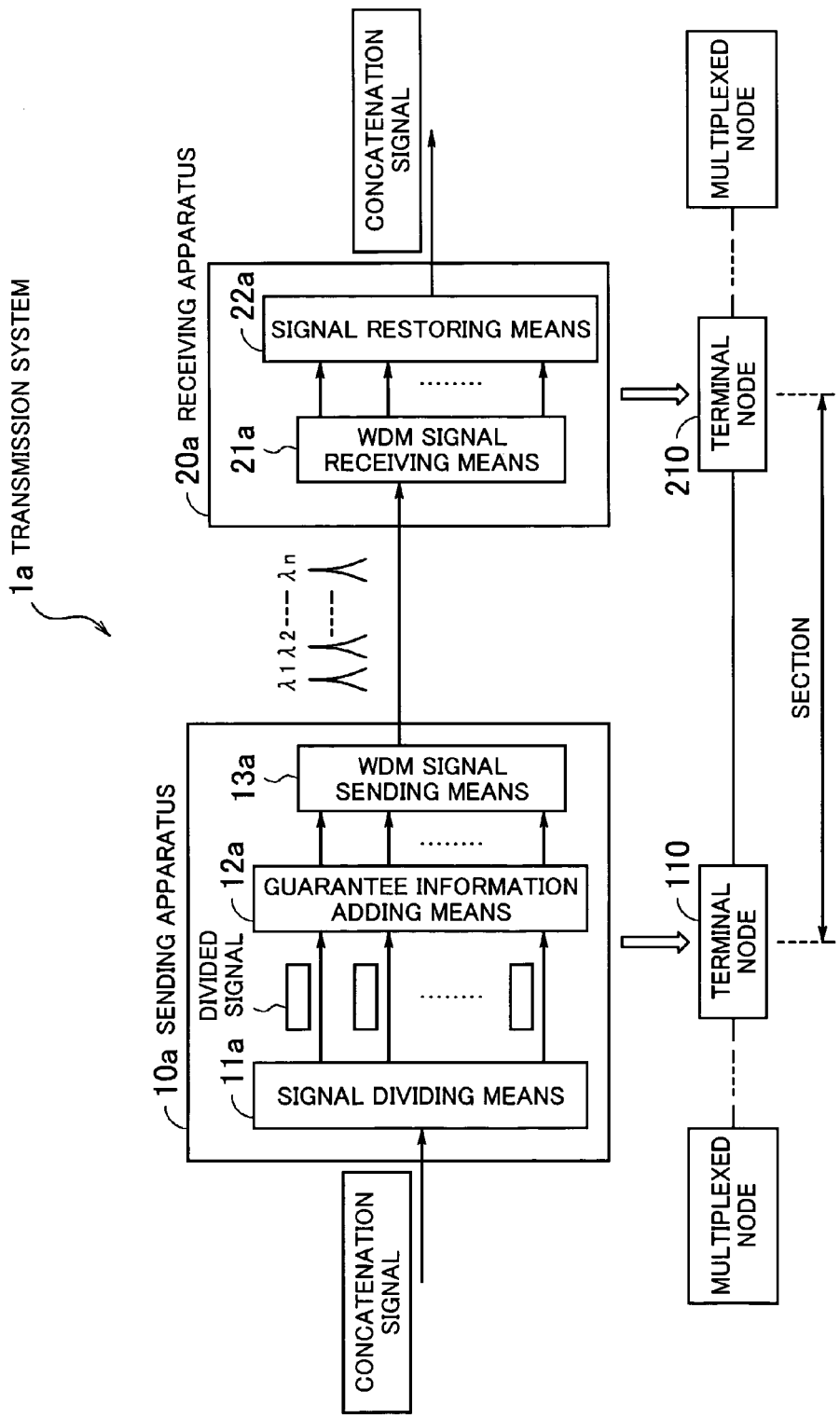
FIG. 15 is a view for describing the principles underlying a transmission system to which WDM is applied.

Now, a transmission system according to the present invention to which WDM (wavelength division multiplex) is applied will be described. FIG. 15 is a view for describing the principles underlying a transmission system to which WDM is applied.

A transmission system 1a comprises a sending apparatus 10a and a receiving apparatus 20a and transmits concatenation signals via a section. The sending apparatus 10a and the receiving apparatus 20a are located at terminal nodes 110 and 210 respectively. These nodes control transmission via a section. The functions of the sending apparatus 10a and the receiving apparatus 20a are practically included in one apparatus.

In the sending apparatus 10a, signal dividing means 11a divides a concatenation signal to generate a plurality of divided signals in the STS or STM transmission interface format the transmission rate of which is lower than that of the concatenation signal.

In this case, the terminal nodes 110 and 210 have established a WDM network along the section. Processes by the path are not performed at the terminal nodes 110 and 210 (there is no need to recognize signals by the path). A concatenation signal therefore can be divided by the block including OH.

Guarantee information adding means 12a adds guarantee information for guaranteeing the continuity of the divided signals to each of the divided signals. WDM signal sending means 13a converts the divided signals to which guarantee information is added to optical signals with wavelengths different from one another to perform wavelength multiplexing on the optical signals and sends them via one optical transmission medium.

In the receiving apparatus 20a, WDM signal receiving means 21a receives optical signals, separates them according to wavelengths, and converts them to divided signals. On the basis of the guarantee information, signal restoring means 22a restores the original concatenation signal by constructing the divided signals.

Figure 16:
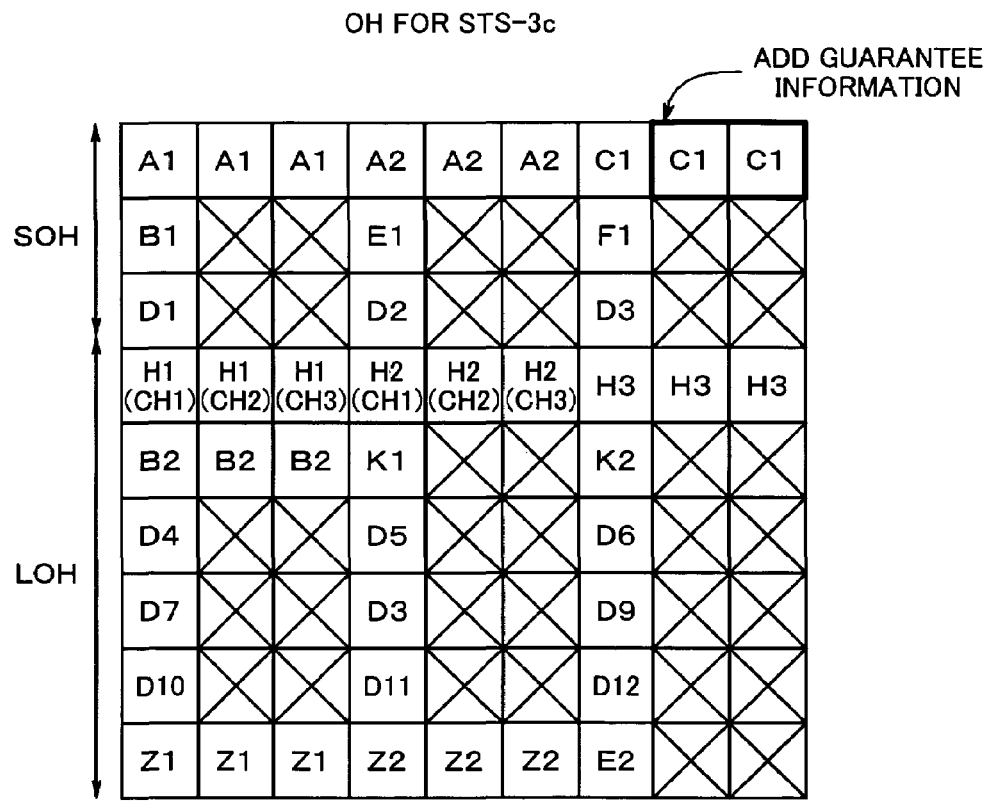
FIG. 16 is a view showing OH.

Guarantee information will now be described. The guarantee information adding means 12a adds guarantee information in byte C1 of SOH (byte C1 of a Regeneration Section Overhead (RSOH)) for a divided signal. FIG. 16 is a view showing OH.

OH consists of SOH and LOH. OH for an STS-3c is shown in FIG. 16. With the transmission system 1a according to the present invention to which WDM is applied, bytes C1 shown in FIG. 16 are used to add guarantee information.

FIG. 17 is a view showing the contents of guarantee information. Concatenation information is added in bits 1 through 4 of byte C1 #2. The contents of concatenation information indicate what the original concatenation signal is.

Frame information is added in bits 5 through 8 of byte C1 #2. The contents of frame information indicate a frame number before division. With WDM there occurs little transmission line delay, so frame information can be reduced.

Block information is added in bits 1 through 8 of byte C1 #3. The contents of block information indicate a division number at the time of division. Divided signals are numbered serially in order of division according to wavelengths. These signals should be reproduced in numerical order on the receiver side.

Figure 18:
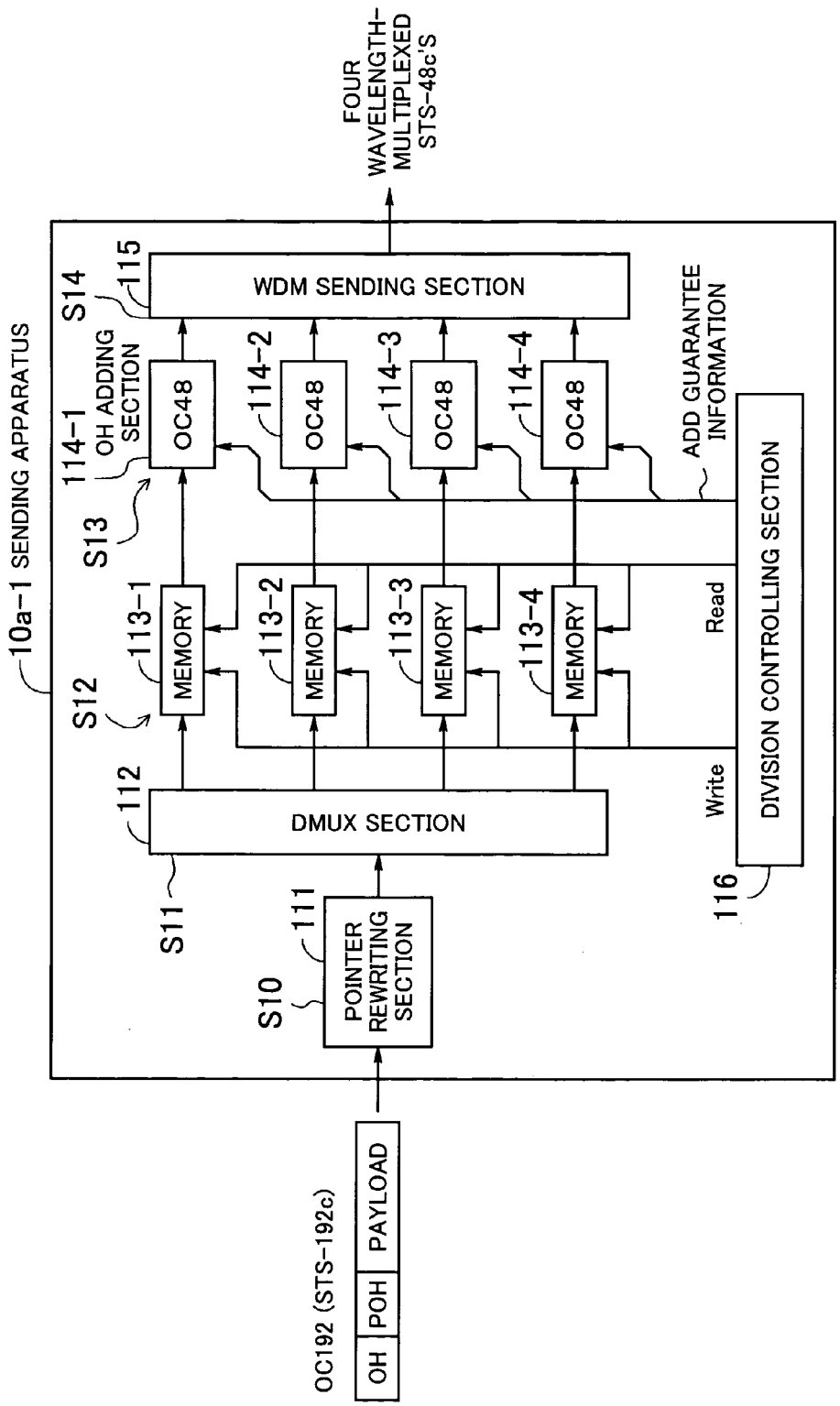
FIG. 18 is a block diagram showing the configuration of a sending apparatus.
Figure 19:
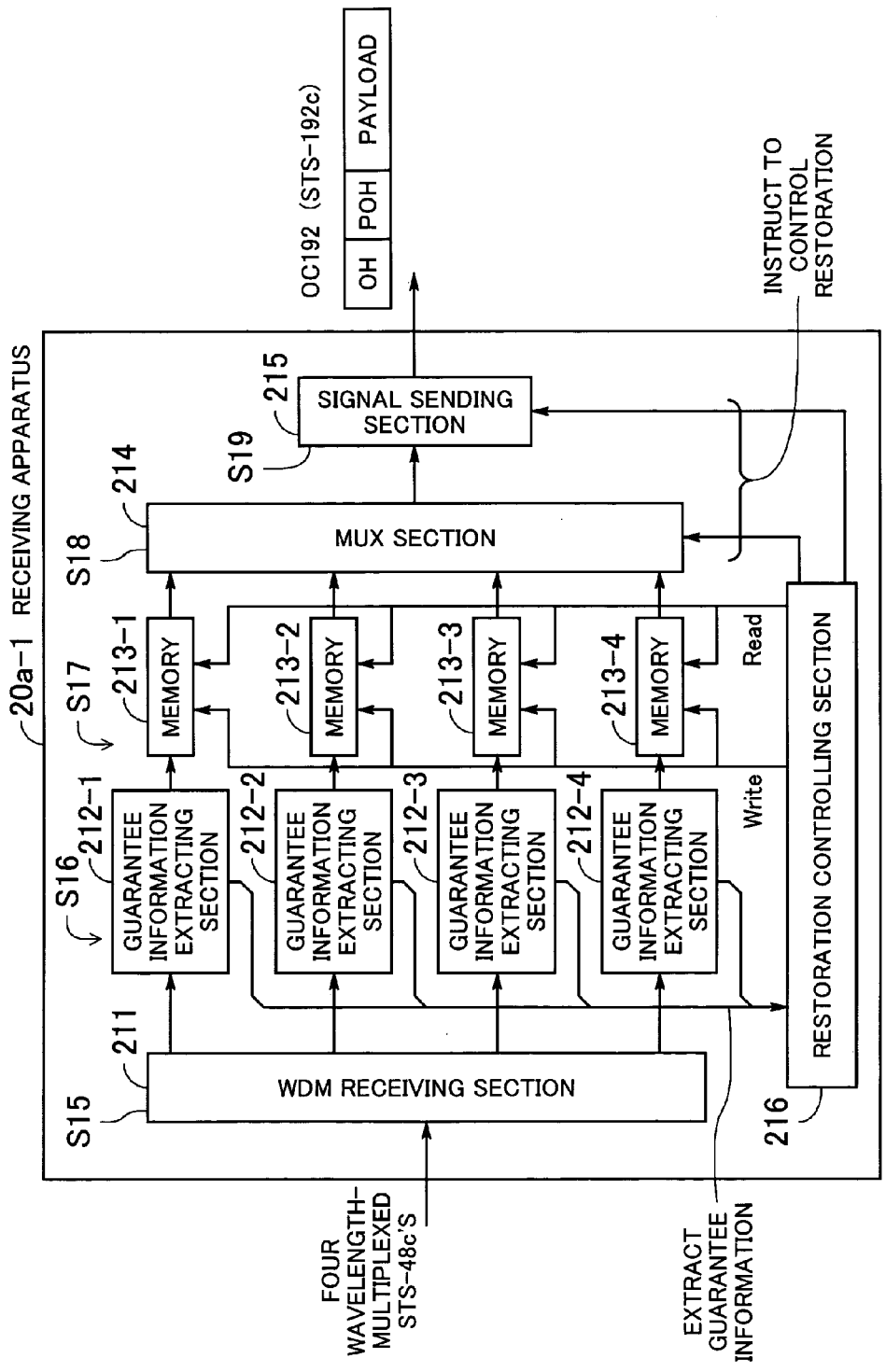
FIG. 19 is a block diagram showing the configuration of a receiving apparatus.
Figure 20:
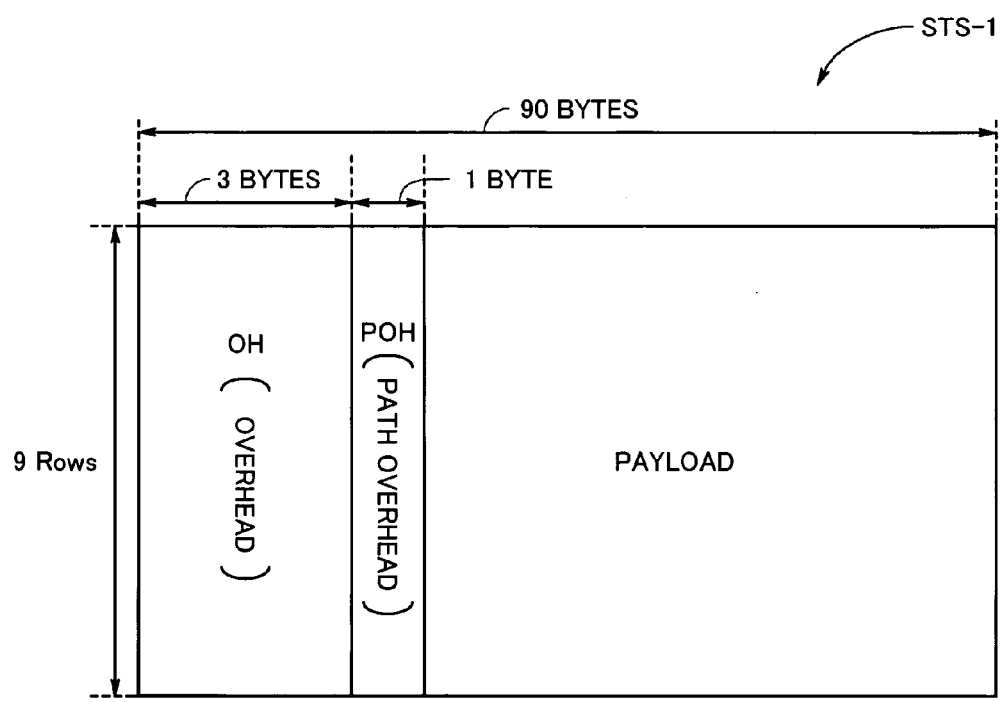
FIG. 20 is a view showing the structure of the format of an STS-1.
Figure 21:
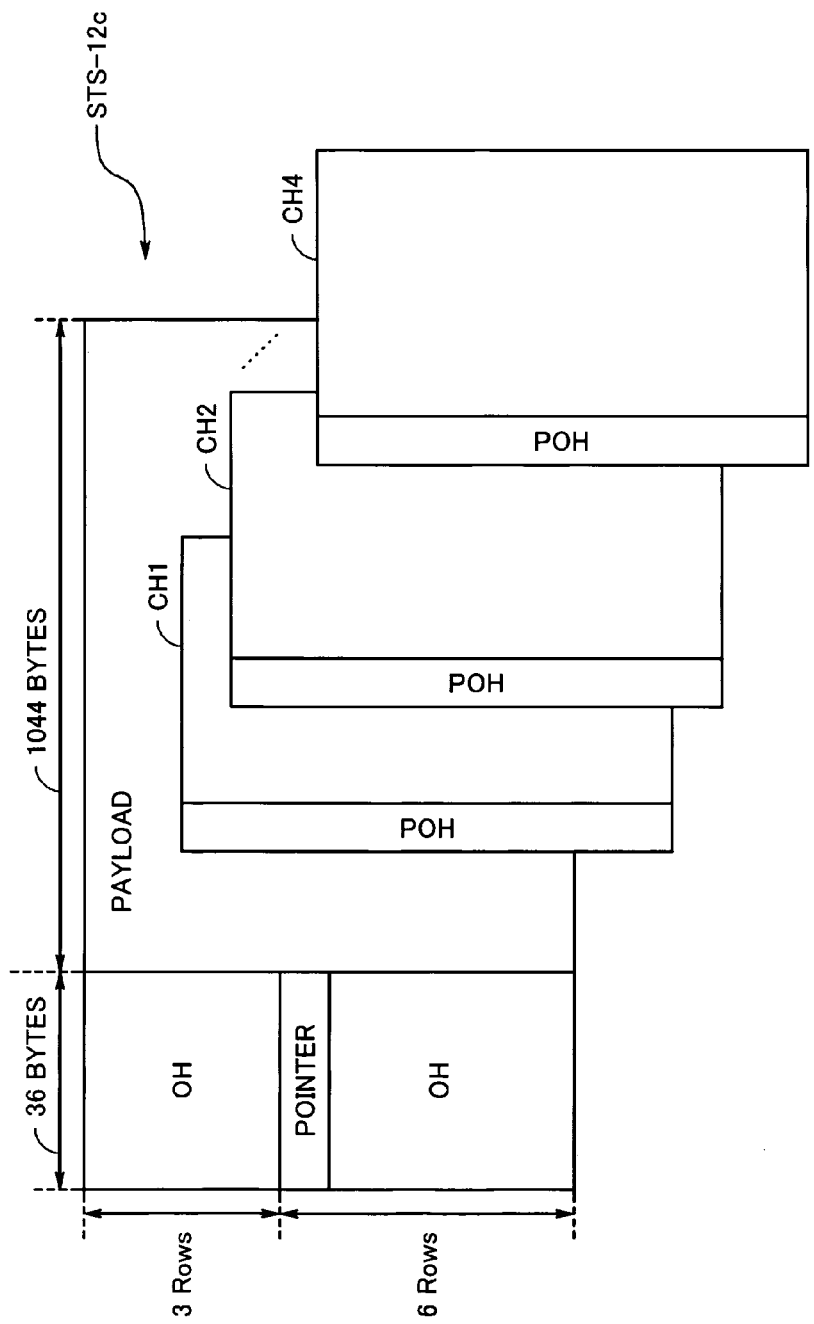
FIG. 21 is a view showing the structure of the format of an STS-12c.

Now, the configuration and operation of the transmission system 1a in which functions according to the present invention are embodied will be described. FIG. 18 is a block diagram showing the configuration of a sending apparatus. FIG. 19 is a block diagram showing the configuration of a receiving apparatus. In FIGS. 18 and 19, an STS-192c is divided into STS-48c×4 and they are wavelength-multiplexed and transmitted.

A sending apparatus 10a-1 comprises a pointer rewriting section 111 for rewriting a pointer, a DMUX section 112 for dividing an STS-192c into STS-48c's, memories 113-1 through 113-4 for changing a rate, OH adding sections 114-1 through 114-4 for adding OH including guarantee information, a WDM sending section 115 for controlling an interface for WDM sending, and a division controlling section 116 for exercising necessary control over each section at the time of division.

A receiving apparatus 20a-1 comprises a WDM receiving section 211 for controlling an interface for WDM receiving, guarantee information extracting sections 212-1 through 212-4 for extracting guarantee information, memories 213-1 through 213-4 for converting a rate, a MUX section 214 for constructing divided signals, a signal sending section 215 for controlling an interface for sending signals, and a restoration controlling section 216 for exercising necessary control over each section at the time of restoration.

The operation will now be described.

[S10] The pointer rewriting section 111 terminates OH for an STS-192c and then rewrites a pointer for the STS-192c to one for an STS-48c. In this case, the cross-connection function does not exist between apparatus, so there is no need to change a pointer. As a result, the relationship between OH and a synchronous payload envelope (SPE), being POH+payload, will not be disturbed. A pointer for the STS-192c therefore is copied to use as one for an STS-48c.

[S11] The DMUX section 112 performs a DMUX process on four STS-48c's, which are generated from the STS-192c, by the block. To be concrete, the DMUX section 112 divides the STS-192c by forty-eights with a byte as a unit to generate four STS-48c's.

[S12] The memories 113-1 through 113-4 change a clock for processing data from an internal processing clock to a sending clock.

[S13] The OH adding sections 114-1 through 114-4 add substantial OH into bytes C1 of which concatenation information, frame information, and block information, being guarantee information, have been written to each STS-48c.

[S14] The WDM sending section 115 performs wavelength multiplexing on the STS-48c's by assigning different wavelengths and sends them (sends four wavelength-multiplexed STS-48c signals).

[S15] The WDM receiving section 211 receives the four wavelength-multiplexed STS-48c signals and separates them according to wavelengths to generate four STS-48c divided signals.

[S16] The guarantee information extracting sections 212-1 through 212-4 extract guarantee information from bytes C1 and give its contents to the restoration controlling section 216.

[S17] The memories 213-1 through 213-4 change a clock for processing data from an internal processing clock to a sending clock.

[S18] The MUX section 214 performs a MUX process on the basis of the restoration information (guarantee information) given by the restoration controlling section 216 and performs the process of constructing STS-48c's.

[S19] The signal sending section 215 restores the original STS-192c by adding OH including a pointer for an STS-192c to a signal which was constructed in step S18 and sends it to a transmission line.

As has been described in the foregoing, the transmission system 1a according to the present invention controls the division/restoration of a concatenation signal within a WDM network. In this case, a bit rate cannot be increased easily because of the dispersion characteristic of an optical fiber, being a transmission medium. As a result, in order to increase transmission capacity, WDM technologies are widely used in recent years. Therefore, the present invention will be essential for transmitting a large-capacity concatenation signal by the use of a low-speed WDM network.

Furthermore, the present invention will enable to transmit a large-capacity concatenation signal stably by dividing the band in various photonic networks with wavelengths concatenated in WDM as one set.

Now, an IP network to which the present invention is applied will be described. With conventional networks, a plurality of low-speed interfaces are contained in the payload of an STS-1, being the basic frame for SONET, and are simply frame-multiplexed (STS-1×n) by the STS-1 frame. As a result, high SONET frame rates realize a high transmission rate and large transmission capacity.

On the other hand, with IP networks, being the mainstream in the future, these high SONET frame rates (STS-1×n) are generally considered one IP transmission line and are used (occupied). A plurality of STS-1 frames are used as one large-capacity transmission line (STS-1×nc) on the basis of the concatenation function.

For example, when large-capacity IP data is transmitted to one IP address by the use of the concatenation function in SONET, a concatenation signal can be separated because of the configuration of a system on the route or the like. Even in such a case, the continuity of IP packets will be guaranteed by applying the present invention. Large-capacity data from an IP router therefore can be transmitted without obstruction, resulting in high-quality highly-reliable large-capacity transmission.

In addition, with an IP network to which the present invention is applied, SONET paths suitable for the contents of services regarding IP data can be assigned. For example, large-capacity IP data (transmission of the best effort type) is assigned to capacity corresponding to 75% of a large-capacity concatenation signal STS-192c (equal to STS-144c) and the remaining 25% (equal to STS-48c) is guaranteed to small-capacity but quality-first IP data as a band like a dedicated line. That is to say, an STS-192c can be divided into two partitions.

As has been described in the foregoing, in the present invention, the sender side divides a concatenation signal into low-speed signals by adding guarantee information for guaranteeing the continuity and sends them and the receiver side restores the original large-capacity concatenation signal on the basis of the guarantee information. This enables to transmit a large-capacity concatenation signal efficiently by an economical configuration via a plurality of transmission lines through various networks.

The above explanation has centered on SONET, but the present invention is applicable to SDH in the same way. That is to say, in the above example, an STS-192c was divided to generate STS-3c's, being divided signals. With SDH, however, an STM-64 (VC4-64c) will be divided to generate VC-4's, being divided signals.

As has been described in the foregoing, in a transmission system according to the present invention, the sender side divides a multiplexed signal to generate divided signals in the STS or STM transmission interface format to which guarantee information for guaranteeing their continuity is added and the receiver side restores the original multiplexed signal on the basis of the guarantee information. This enables to transmit a large-capacity multiplexed signal by making effective use of existing network systems in which the bit rate is limited, resulting in efficient transmission of a large-capacity signal.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission system for controlling the transmission of a concatenation signal, the system comprising:
   a sending apparatus including:
      signal dividing means for dividing, according to a bit rate available for a transmission line, the concatenation signal to generate a plurality of divided signals which are concatenation signals having a SONET or SDH multiplexed interface, the bit rate of which is lower than that of the original concatenation signal;
      guarantee information adding means for adding guarantee information for guaranteeing the continuity of the divided signals to each of the divided signals to generate transmission signals;
      signal sending means for assigning the transmission signals to transmission lines to have capacity that is suitable for service contents and sending the transmission signals to one address, in parallel via a plurality of the transmission lines on which the bit rate is limited;
   a receiving apparatus including:
      signal receiving means for receiving the transmission signals;
      signal restoring means for restoring the original concatenation by constructing the divided signals on the basis of the guarantee information; and
   wherein the receiving apparatus further includes delay information notifying means for giving the sending apparatus delay information regarding delays which have occurred at the time of receiving the transmission signals;
   and wherein the signal sending means calculates the bit rates of the divided signals respectively on the basis of the delay information;
   and wherein the signal dividing means divides the concatenation signal to meet the conditions that $X1+ \ldots +Xn=X$, that all the divided signals should reach by time t1, and that $$X1 \geq X2 \geq \ldots \geq Xn$$

where X is the bit rates of the concatenation signal and $X1$–$Xn$ are the bit rates of the divided signals and t1 is a receiving end time of a divided signal which arrived at the receiving apparatus fastest.

2. The transmission system according to claim 1, wherein the guarantee information adding means adds at least one of information regarding the type of the concatenation signal, the frame number of the concatenation signal, and a division number at the time of dividing the concatenation signal to the divided signal as the guarantee information.

3. A transmission system for controlling the transmission of a concatenation signal, the system comprising:
   a sending apparatus including:
      signal dividing means for dividing, according to a bit rate available for a transmission line, the concatenation signal to generate a plurality of divided signals which are concatenation signals having a SONET or SDH multiplexed interface, the bit rate of which is lower than that of the original concatenation signal;
      guarantee information adding means for adding guarantee information for guaranteeing the continuity of the divided signals to each of the divided signals to generate transmission signals;
      signal sending means for assigning the transmission signals to transmission lines to have capacity that is suitable for service contents and sending the transmission signals to one address, in parallel via a plurality of the transmission lines on which the bit rate is limited;
   a receiving apparatus including:
      signal receiving means for receiving the transmission signals;
      signal restoring means for restoring the original concatenation by constructing the divided signals on the basis of the guarantee information; and
   wherein the receiving apparatus further includes delay information notifying means for giving the sending apparatus delay information regarding delays which have occurred at the time of receiving the transmission signals;
   and wherein the signal sending means calculate the bit rates of divided signals respectively on the basis of the delay information;
   and wherein the bit rate BR is given by $BR=X*(T/(T-t))$
   where X is the bit rate of a first divided signal which arrives at the receiving apparatus fastest and T is time distance from a receiving start time (t0) of the first divided signal to a receiving end time (t1) and t is the delay information, is a value for a difference of the time (t1) and a receiving end time of a second divided signal which arrives at the receiving apparatus later than the first divided signal.

4. The transmission system according to claim 3, wherein the guarantee information adding means adds at least one of information regarding the type of the concatenation signal, the frame number of the concatenation signal, and a division number at the time of dividing the concatenation signal to the divided signal as the guarantee information.

* * * * *

UNITED STATES PATENT AND TRADEMARK OFFICE
CERTIFICATE OF CORRECTION

PATENT NO. : 7,239,649 B2  Page 1 of 1
APPLICATION NO. : 09/886268
DATED : July 3, 2007
INVENTOR(S) : Koji Takeguci et al.

It is certified that error appears in the above-identified patent and that said Letters Patent is hereby corrected as shown below:

Title Page, item (63) on the Title page of the patent in the left column is deleted and the following is substituted:

Related U.S. Application Data
(63) Continuation of application No. PCT/JP00/07521, filed on October 26, 2000.

Signed and Sealed this

Twenty-fifth Day of November, 2008

JON W. DUDAS
*Director of the United States Patent and Trademark Office*